(12) United States Patent
Tanaka et al.

(10) Patent No.: US 8,134,731 B2
(45) Date of Patent: Mar. 13, 2012

(54) PRINTING DEVICE THAT PRIORITIZES PROCESSING OF RAW AND JPEG DATA ACCORDING TO AMOUNT OF PRINT DATA IN STANDBY STATE

(75) Inventors: Yoichi Tanaka, Shiojiri (JP); Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 874 days.

(21) Appl. No.: 12/187,192

(22) Filed: Aug. 6, 2008

(65) Prior Publication Data

US 2009/0040552 A1 Feb. 12, 2009

(30) Foreign Application Priority Data

Aug. 10, 2007 (JP) ................................. 2007-210039

(51) Int. Cl.
*G06F 3/12* (2006.01)
(52) U.S. Cl. .......... 358/1.15; 358/1.1; 358/1.6; 358/1.9; 382/233; 382/282; 382/307
(58) Field of Classification Search .................. 382/235, 382/238, 239, 240, 302, 303, 304, 305, 307; 358/1.15, 539, 540, 426.01, 426.02, 426.04, 358/426.05, 450
See application file for complete search history.

(56) References Cited

U.S. PATENT DOCUMENTS 6,049,394 A * 4/2000 Fukushima ................. 358/1.9

FOREIGN PATENT DOCUMENTS

| JP | 10-305639 | | 11/1998 |
|----|-----------|---|---------|
| JP | 2001-236186 | * | 8/2001 |
| JP | 2003-303068 | | 10/2003 |
| JP | 2005-033468 | | 2/2005 |
| JP | 2006-258614 | * | 9/2006 |
| JP | 2007-081478 | * | 3/2007 |

* cited by examiner

*Primary Examiner* — Charlotte M Baker
*Assistant Examiner* — Aaron R Gerger
(74) *Attorney, Agent, or Firm* — DLA Piper LLP (US)

(57) ABSTRACT

Provided is a printing device for preparing print data from image data and sequentially printing the print data, the printing device including: a print instruction receiving unit which receives a print instruction with the selection of the image data; and a print data preparing unit which, when the print instruction is received by the print instruction receiving unit with the selection of a plurality of pieces of image data including JPEG data and RAW data before a development process, performs a process of preparing the print data from the JPEG data among the plurality of pieces of selected image data prior to a process for performing the development process with respect to the RAW data and preparing the print data if at least a predetermined amount of print data in a print standby state, in which printing is not completed by the printing device, is not present, and performs the process for performing the development process with respect to the RAW data and preparing the print data prior to the process of preparing the print data from the JPEG data if the at least predetermined amount of print data in the print standby state, in which printing is not completed by the printing device, is present.

7 Claims, 4 Drawing Sheets

PRINTING DEVICE THAT PRIORITIZES PROCESSING OF RAW AND JPEG DATA ACCORDING TO AMOUNT OF PRINT DATA IN STANDBY STATE

BACKGROUND

1. Technical Field

The present invention relates to a printing device for receiving and printing an image, a control method thereof, a program for executing steps of the method of controlling the printing device on one or a plurality of computers.

2. Related Art

A data recording format of a digital camera, a JPEG format or a RAW format is known (for example, see JP-A-2005-33468). Data (RAW data) recorded in the RAW format is obtained by converting an electrical signal obtained by charges generated when a color image sensor receives light into digital data, and is incomplete data as image data because one pixel has only one color component of RGB. Accordingly, when printing is performed using the RAW data, a development process of interpolating insufficient color components of each pixel by color components of peripheral pixels and generating a color image having three color components in each pixel needs to be performed.

However, in a printing device including a development processing module for performing the development process of the RAW data, printing may be performed by directly inputting the RAW data in addition to JPEG data. However, since the development process requires a relatively long processing time, the printing of the RAW data requires a longer time than the printing of the JPEG data. In the printing device including the development processing module, if a plurality of pieces of image data including the JPEG data and the RAW data are received and printed, print data may be prepared and printed in the reception order of the image data. However, as described above, since the development process requires the relatively long processing time, the development process of the RAW data is delayed and thus the process of the JPEG data may be delayed. In this case, a total printing time is increased.

SUMMARY

An advantage of some aspects of the invention is that it provides a printing device which is capable of shortening a printing time, a control method thereof, and a program.

A printing device, a control method thereof, and a program of the invention employ the following units in order to accomplish the above-described object.

According to an aspect of the invention, there is provided a printing device for preparing print data from image data and sequentially printing the print data, the printing device including: a print instruction receiving unit which receives a print instruction with the selection of the image data; and a print data preparing unit which, when the print instruction is received by the print instruction receiving unit with the selection of a plurality of pieces of image data including JPEG data and RAW data before a development process, performs a process of preparing the print data from the JPEG data among the plurality of pieces of selected image data prior to a process for performing the development process with respect to the RAW data and preparing the print data if at least a predetermined amount of print data in a print standby state, in which printing is not completed by the printing device, is not present, and performs the process for performing the development process with respect to the RAW data and preparing the print data prior to the process of preparing the print data from the JPEG data if the at least predetermined amount of print data in the print standby state, in which printing is not completed by the printing device, is present.

In the printing device of the invention, a print instruction is received with the selection of the image data, and, when the print instruction is received with the selection of a plurality of pieces of image data including JPEG data and RAW data before a development process, a process of preparing the print data from the JPEG data among the plurality of pieces of selected image data is performed prior to a process for performing the development process with respect to the RAW data and preparing the print data if at least a predetermined amount of print data in a print standby state, in which printing is not completed by the printing device, is not present, and the process for performing the development process with respect to the RAW data and preparing the print data is performed prior to the process of preparing the print data from the JPEG data if the at least predetermined amount of print data in the print standby state, in which printing is not completed by the printing device, is present. Accordingly, since the development process of the RAW data can be executed while the printing is executed on the basis of the print data, it is possible to suppress an idle time in which the printing is not executed from occurring while the development process of the RAW data is performed. As a result, the printing can be efficiently performed and the print time can be shortened.

In the printing device of the invention, the predetermined amount may be decided such that a time necessary for printing the print data in the print standby state becomes equal to or greater than a time necessary for at least the development process. By this configuration, it is possible to suppress the idle time in which the printing is not executed from occurring while the development process of the RAW data is performed. The "at least time necessary for the development process" includes the time necessary for the process of performing the development process with respect to the RAW data and preparing the print data in addition to the time necessary for the development process of the RAW data.

In the printing device of the invention, the print instruction receiving unit may receive the print instruction with print setting, and the print data preparing unit may determine whether the at least predetermined amount of print data in the print standby state is present on the basis of the print setting. By this configuration, it is possible to more accurately check the print time of the print data in the print standby state. Here, the "print setting" includes a sheet size or print quality.

In the printing device of the invention, the print data preparing unit may perform the development process with respect to the RAW data and prepares the print data although the at least predetermined amount of print data in the print standby state is not present when unprocessed JPEG data from which the print data should be prepared is not present. By this configuration, it is possible to print the plurality of pieces of image data including the JPEG data and the RAW data with certainty.

According to another aspect of the invention, there is provided a method of controlling a printing device for preparing print data from image data and sequentially printing the print data, the method including: receiving a print instruction with the selection of the image data; and, when the print instruction is received with the selection of a plurality of pieces of image data including JPEG data and RAW data before a development process, performing a process of preparing the print data from the JPEG data among the plurality of pieces of selected image data prior to a process for performing the development process with respect to the RAW data and preparing the print data if at least a predetermined amount of print data in a print standby state, in which printing is not completed by the printing device, is not present, and performing the process for performing the development process with respect to the RAW data and preparing the print data prior to the process of preparing the print data from the JPEG data if the at least predetermined amount of print data in the print standby state, in which printing is not completed by the printing device, is present.

In the method of controlling the printing device of the invention, a print instruction is received with the selection of the image data, and, when the print instruction is received with the selection of a plurality of pieces of image data including JPEG data and RAW data before a development process, a process of preparing the print data from the JPEG data among the plurality of pieces of selected image data is performed prior to a process for performing the development process with respect to the RAW data and preparing the print data if at least a predetermined amount of print data in a print standby state, in which printing is not completed by the printing device, is not present, and the process for performing the development process with respect to the RAW data and preparing the print data is performed prior to the process of preparing the print data from the JPEG data if the at least predetermined amount of print data in the print standby state, in which printing is not completed by the printing device, is present. Accordingly, since the development process of the RAW data can be executed while the printing is executed on the basis of the print data, it is possible to suppress an idle time in which the printing is not executed from occurring while the development process of the RAW data is performed. As a result, the printing can be efficiently performed and the print time can be shortened.

A program of the invention executes the steps of the method of controlling the printing device on one or a plurality of computers. This program may be recorded in a computer-readable recording medium (for example, a hard disc, a ROM, a FD, a CD, a DVD or the like), may be transmitted from a computer to another computer via a transmission medium (a communication network such as the Internet or a LAN), or may be exchanged by other methods. If this program is executed on one computer or executed on the plurality of computers by dividing the steps, the steps of the method of controlling the printing device are executed and thus the same effect as the control method can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
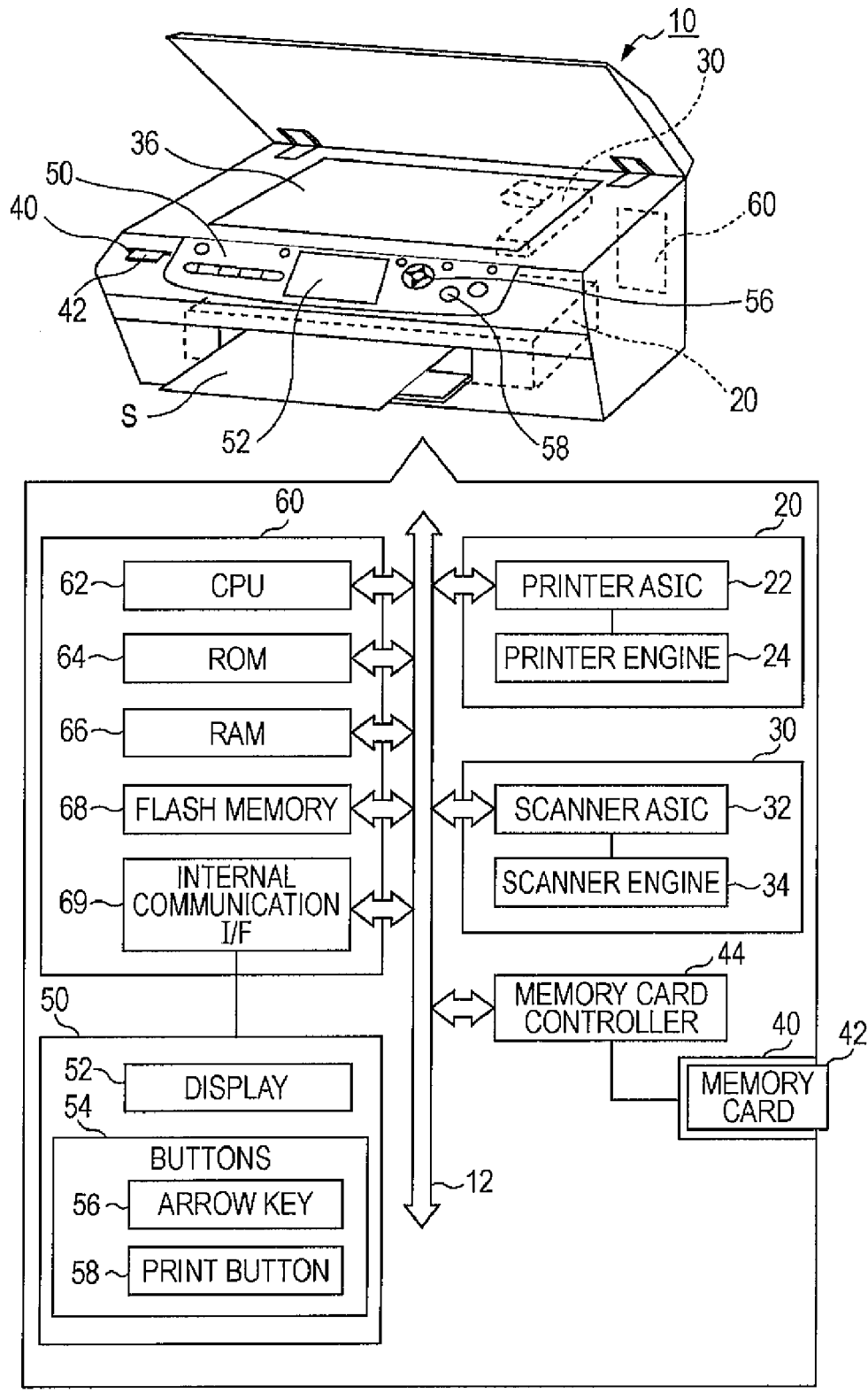
FIG. 1 is an appearance view and a block diagram of a multi-functional printer 10.
Figure 2:
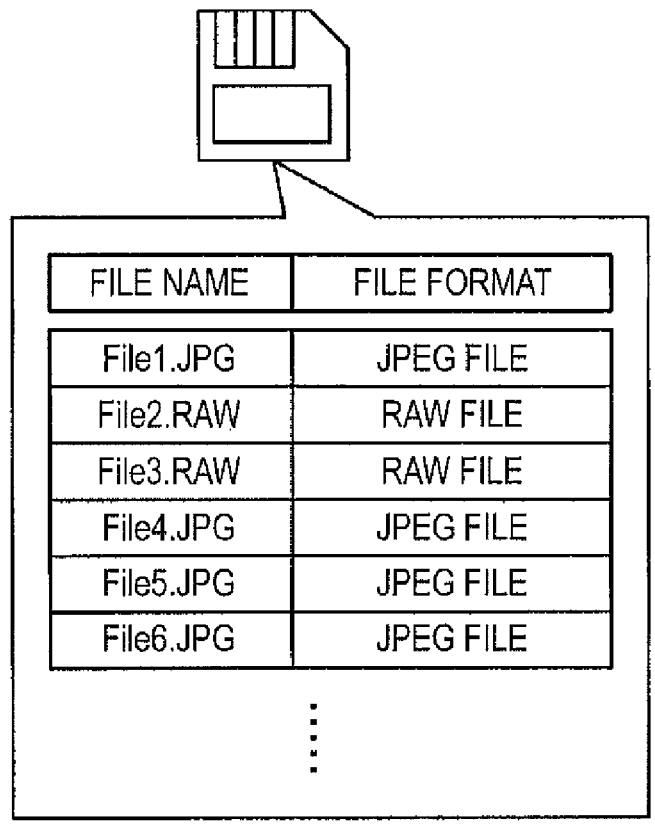
FIG. 2 is a view illustrating a file recorded in a memory card 42.

Hereinafter, embodiments of the invention will be described with reference to the accompanying drawings. FIG. 1 is an appearance view and a block diagram showing the schematic configuration of a multi-functional printer 10 according to an embodiment of the invention. FIG. 2 is a view illustrating a file recorded in a memory card 42.

As shown in FIG. 1, the multi-functional printer 10 according to the present embodiment includes a printer unit 20 for performing printing onto a printing sheet S on the basis of a printing operation, a scanner unit 30 for reading a document mounted a glass platen 36, a memory card controller 44 for inputting/outputting data to a memory card inserted into a memory card slot 40, an operation panel for displaying a variety of information on a display unit or inputting an instruction of a user by the operation of buttons 54, and a main controller 60 for controlling the device. In the multi-functional printer 10, the printer unit 20 or the scanner unit 30, the memory card controller 44 and the main controller 60 may exchange a variety of control signals or data via a bus 12.

The printer unit 20 includes a printer ASIC 22 and a printer engine 24. The printer ASIC 22 is an integrated circuit for controlling the printer engine 24 and controls the printer engine 24 such that an image file, which is an object of a printing instruction, on a sheet S when the printing instruction is received from the main controller 60. The printer engine 24 is an ink jet color printer mechanism for performing printing by ejecting ink from a printing head onto the sheet. The ASIC is an abbreviation of an application specific integrated circuit.

The scanner unit 30 includes a scanner ASIC 32 and a scanner engine 34. The scanner ASIC 32 is an integrated circuit for controlling the scanner engine 34 and controls the scanner engine 34 such that image data of a document laid on the glass platen 36 is read when a scan instruction is received from the main controller 60. The scanner engine 34 is a known image scanner and includes a known color image sensor for decomposing light, which is emitted to the document and reflected from the document, into colors of red (R), green (G) and blue (B) and using the colors as scan data.

The memory card controller 44 inputs/outputs data to/from the memory card 42 inserted into the memory card slot 40 provided adjacent to the operation panel 50. The memory card controller 44 reads and transmits a file stored in the memory card 42 to the main controller 60 or receives a command from the main controller 60 and writes data to the memory card 42 on the basis of the command, when the memory card 42 is connected to the memory card slot 40. At this time, as shown in FIG. 2, for example, an image file such as a RAW file or a JPEG file photographed and recorded by a digital camera is stored in the memory card 42.

Figure 3:
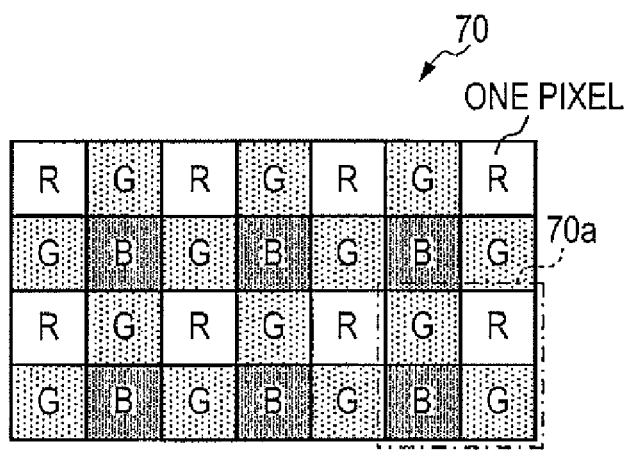
FIG. 3 is a view illustrating a CCD.

The RAW file is a file prepared in the digital camera when being photographed by the digital camera and is stored in the memory card 42 inserted into the digital camera. The RAW data included in the RAW file is unprocessed data obtained by converting an electrical signal obtained from charges generated by light received by a pickup device (for example, a CCD or a CMOS) of the digital camera into digital data and has one color component of RGB with respect to one pixel. If the pickup device is a color CCD, for example, as shown in FIG. 3, in a color CCD 70 used in the digital camera, each of CCD elements are covered with any one color filer of three colors of RGB such that the elements can identify different colors and one R filter, one B filter and two G filers are disposed in a window 70a of 2 pixels×2 pixels. The RAW data is incomplete data as image data because each pixel has only one color component of RGB. When the RAW data is printed, a development process such as a process of interpolating insufficient color components of each pixel by peripheral pixels and generating a color image having three color components of RGB in each pixel is performed. The RAW data has fertile expression of gradation of 8 to 16 bits of RGB and is not compressed or is reversibly compressed such that the data can be restored to the same state.

The JPEG file is a file prepared in the digital camera when being photographed by the digital camera and is stored in the memory card 42 inserted into the digital camera. The JPEG data included in the JPEG file is data prepared by performing the development process with respect to the RAW data generated by the digital camera, and color information of each pixel of the image data is represented by a YCbCr color coordinate known by the JPEG compression standard. The JPEG-compressed image data prepared herein is prepared by properly thinning information included in the RAW data so as to decrease the data size. In addition, since an operation error of a computer occurs at the time of the JPEG compression, the RAW data cannot be re-created from the JPEG-compressed image data by 100 percents.

The operation panel 50 includes the display unit 52 and the buttons 54. The display unit 52 is a liquid crystal display and displays information on a printing state, a print setting menu screen, an input screen of a development parameter, and image data to be printed. The buttons 54 include an arrow key 56 which is operated at the time of the selection of image data to be printed, the selection of the print setting, or the input of the development parameter, a print button 58 which is pressed when the selected image data is printed, a decision button (not shown) which is pressed when the development parameter is decided, and a power source button (not shown) which is operated when a power source is turned on/off, and can input the instruction of the user to the main controller 60 via an internal communication interface 69. Although not shown, the print setting menu screen includes setting items such as a sheet type (for example, photo paper, plain paper, mat coated paper or the like), a sheet size (for example, an L size, a postcard size, A4 or the like), a layout (for example, existence/nonexistence of a frame), print quality (for example, fast, standard, clean or the like), automatic image quality adjustment for automatically adjusting an image to an optimal color (for example, adjustment or non-adjustment), brightness adjustment (for example, brighter, bright, standard, dark, or darker), contrast (for example, standard, strong, or weak), sharpness (for example, strong sharpness, weak sharpness, standard, weak soft focus or strong soft focus) and can be set by the arrow key 56. Although not shown, the input screen of the development parameter includes a setting item of an exposure value in addition to the general image quality adjustment parameters. The exposure value is set by the arrow key 56 in a range of −2.0 to +2.0.

The main controller 60 is configured by a microprocessor including a CPU 62, and includes a ROM 64 for storing a variety of processing programs, a variety of data and a variety of tables, a RAM 66 for temporarily storing scan data or print data, a flash memory 68 in which data can be electrically written and which stores data even when the power source is turned off, and an internal communication interface 69 for performing the communication of the operation panel 50, all of which are connected so as to exchange the signal via the bus 12. The main controller 60 receives a variety of operation signals or a variety of detection signals from the printer unit 20, the scanner unit 30 and the memory card controller 44 or receives the operation signal generated by operating the buttons 54 of the operation panel 50. An instruction output to the main controller 60 by reading the RAW file or the JPEG file from the memory card 42 is output to the memory card controller 44, an instruction is output to the printer data 20 such that the developed data (for example, the JPEG-compressed image data) is printed, an instruction is output to the scanner unit 30 such that the document laid on the glass platen 36 is read as the image data on the basis of the scan instruction of the buttons 54 of the operation panel 50, or a control instruction of the display unit 52 is output to the operation panel 50.

Next, the operation of the multi-functional printer 10 according to the present embodiment, and more particularly, the operation in the case where a plurality of pieces of image data including the RAW data included in the RAW file stored in the memory card 42 and the JPEG data included in the JPEG file are received and printed will be described.

Figure 4:
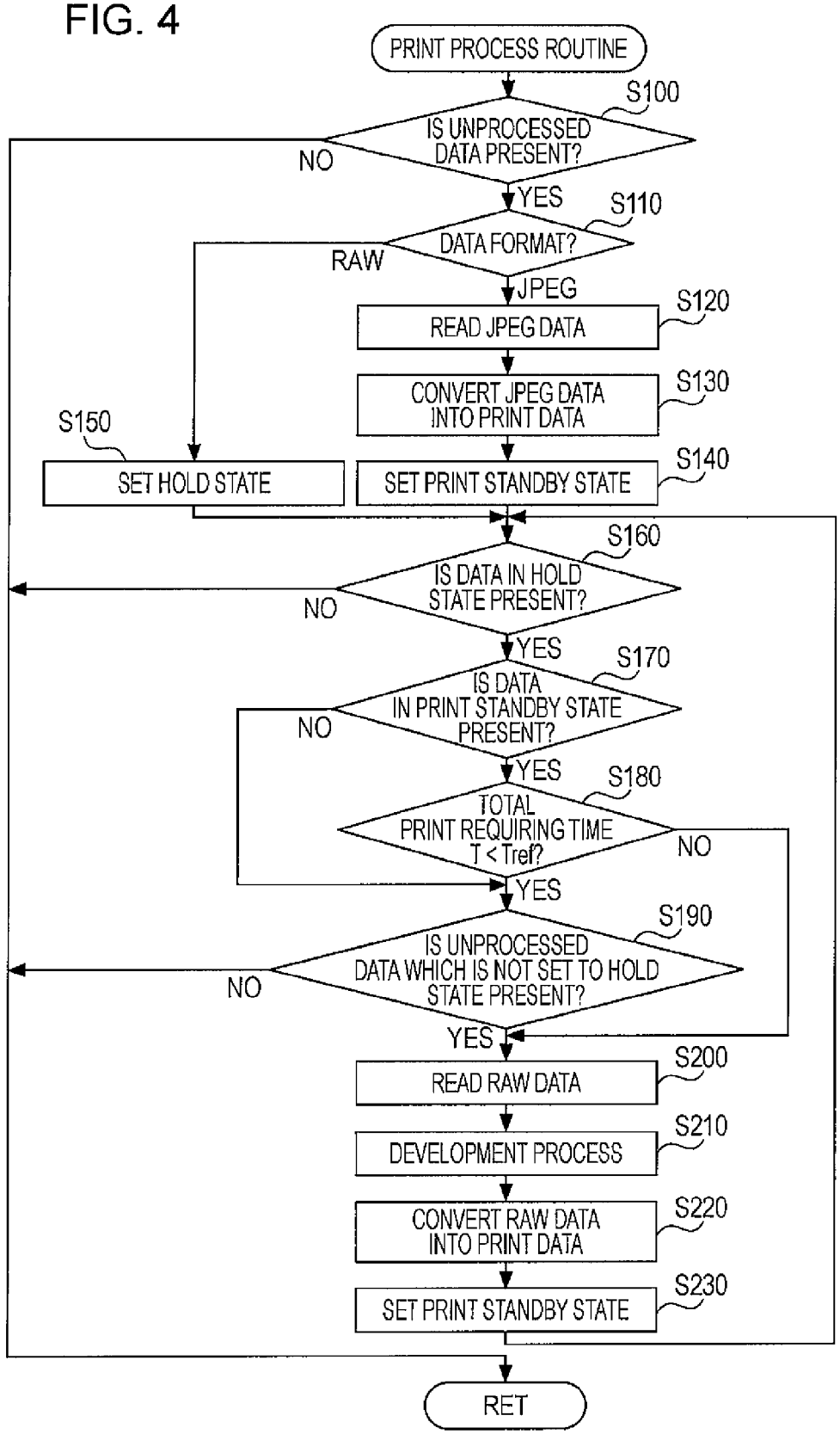
FIG. 4 is a flowchart showing an example of a print process routine.

FIG. 4 is a flowchart showing an example of a print process routine executed by the CPU 62 of the multi-functional printer 10. This routine is stored in the ROM 64 of the multi-functional printer 10. This routine is repeatedly executed with respect to one image when the user operates the arrow key 56 of the operation panel 50 such that the image data stored in the memory card 42 is selected as a print object and print setting of the selected print object is selected and the user presses a print button 58 of the operation panel 50 such that a print instruction is input via the internal communication interface 69.

When the print process routine is performed, the CPU 62 of the multi-functional printer 10 determines whether unprocessed data in which print data is not prepared is present in the image data selected by the user as the print object (step S100). Immediately after the print button 58 is pressed by the user such that this routine is started, it is determined that the unprocessed data is present and the data format of the unprocessed data is determined (step S110). The determination of the data format may be performed by examining the extension of the file stored in the memory card 42. If it is determined that the unprocessed data is not present because the printing process is completed, this routine is completed.

If the data format is the JPEG data, the JPEG data is read (step S120), the read JPEG data is converted into print data which can be processed by the printer engine 24 (step S130), the converted print data is set to a print standby state (step S140), and the routine progresses to a next process. The conversion into the print data is performed by decompressing (decoding) the JPEG data, converting YCbCr data into RGB data using a YcbCr-RGB conversion table as a color coordinate of the JPEG data and performing a halftone process or a RGB-CMYK color conversion process with respect to the converted RGB data. When the print data is prepared, a print control command is added to the print data and the print data is output to the printer ASIC 22. The printer ASIC 22 sequentially receives the print data and controls the printer engine 24 such that printing is performed according to the print control command. When the printing of the print data is completed by the printer engine 24, the print data is discarded and the setting of the print standby state is cancelled. In contrast, if the data format is the RAW data, a hold state is set such that the execution of the development process of the RAW data is held (step S150) and the routine progresses to a next process. This reason will be described later.

Figure 5:
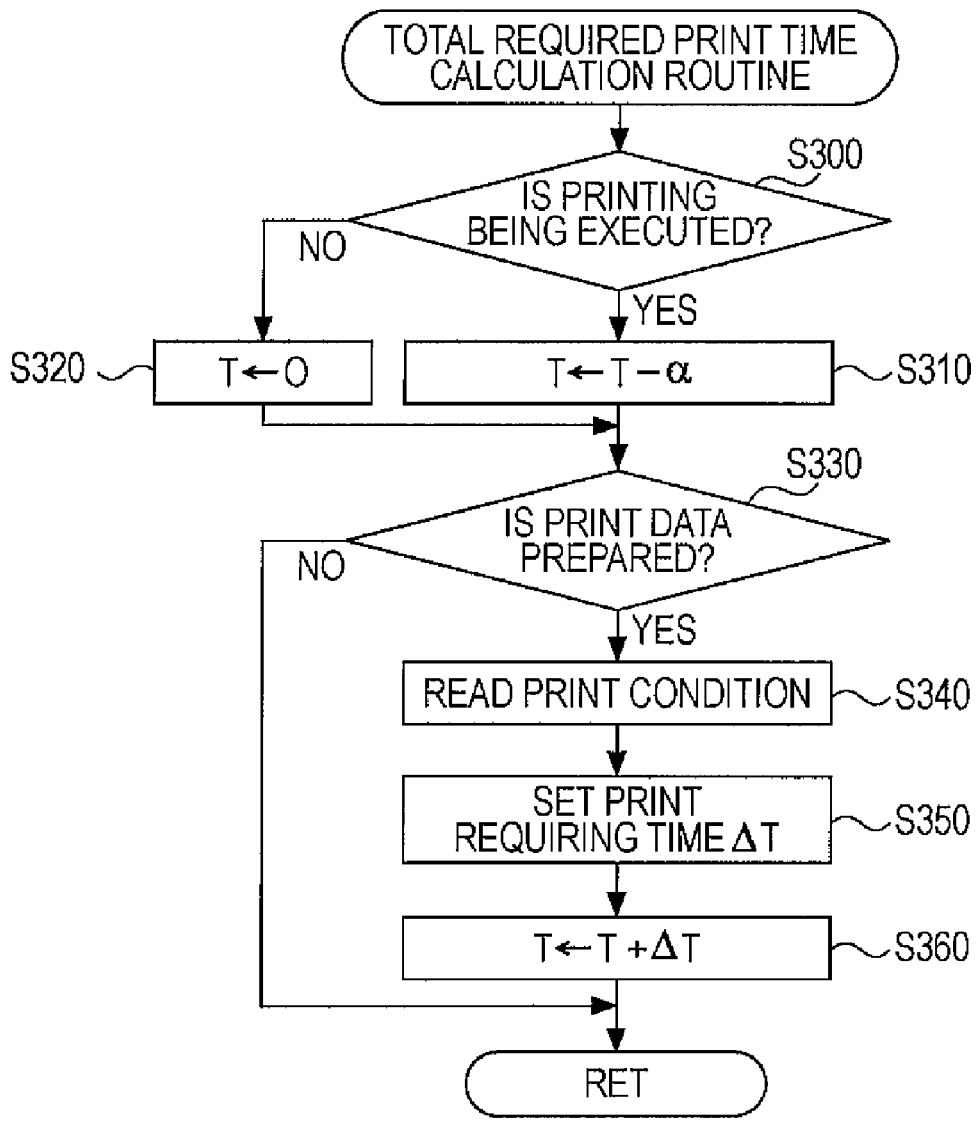
FIG. 5 is a flowchart showing an example of a total print requiring time calculation routine.

Next, it is determined whether the RAW data in the hold state is present (step S160). If the RAW data in the hold state is not present, in order to examine next unprocessed data, this routine is completed. If the held RAW data is present, it is determined whether print data in the print standby state (the print data is prepared, but the execution of the printing is not completed by the printer engine 24) is present (step S170). If the print data which is set to the print standby state is present, it is determined whether a total print requiring time T as a time necessary for completing the printing of the print data is less than a threshold Tref (step S180). The total print requiring time T is calculated by a total print requiring time calculation routine shown in FIG. 5. Now, the description of the print process routine of FIG. 4 is stopped and the total print requiring time calculation routine of FIG. 5 will be described. This routine is repeatedly executed every predetermined time by the controller 60. In the total print requiring time calculation routine, the CPU 62 of the controller 60 determines whether the printing is being executed by the printer engine 24 (step S300), a time interval α for executing this routine is subtracted from the total print requiring time T calculated by a previous routine so as to set a new total print requiring time T if it is determined that the printing is being executed (step S310), and the total print requiring time T is reset to 0 when the printing is not being executed (step S320). Then, it is determined whether the print data is prepared by the print process routine of FIG. 4 (step S330), the print condition of the print data prepared when the print data is prepared is read (step S340), the print requiring time ΔT is set on the basis of the read print condition (step S350), the set print requiring time ΔT is added so as to update the total print requiring time T (step S360), and this routine is completed In contrast, when the print data is not prepared, this routine is completed without updating the total print requiring time T. Here, in the present embodiment, the print requiring time ΔT is stored in the ROM 64 as a map by previously obtaining a relationship among the sheet size, the print quality and the print requiring time ΔT using the sheet size (for example, the L size, the postcard size, A4 or the like) and the print quality (for example, fast, standard, clean or the like) as the print condition and the corresponding print requiring time ΔT is obtained from the map when the sheet size and the print quality are given. In the present embodiment, the threshold Tref used for determination of the step S180 of the print process routine of FIG. 4 is previously obtained as a time necessary for the process of preparing the print data by performing the development process with respect to the RAW data. Accordingly, the determination of the step S180 determines whether the print data in the print standby state is prepared until the time necessary for executing all the print data in the print standby state by the printer engine 24 becomes equal to or greater than the time necessary for the process of preparing the print data by performing the development process with respect to the RAW data.

If it is determined that the print data in the print standby state is not present in the step S170 or if it is determined that the print data in the print standby state is present in the step S170 but it is determined that the total print requiring time T is less than the threshold Tref in the step S180, it is determined whether unprocessed data which is not set to the hold state is present, that is, it is determined whether unprocessed data is present excluding the RAW data in the hold state (STEP s190), and, if it is determined that the unprocessed data is present excluding the PAW data in the hold state, this routine is completed in order to examine next unprocessed data. In contrast, if it is determined that the RAW data in the hold state is present in the step S160, it is determined that the print data in the print standby state is present in the step S170, and if it is determined that the total print requiring time T is equal to or greater than the threshold Tref in the step S180, the RAW data in the hold state is read (step S200), the development process is performed with respect to the read RAW data so as to prepare the developed data (step S210), the prepared data is converted into the print data by the same process as the step S130 (step S220), the converted print data is set to the print standby state (step S230), and the routine returns to the step S160. Here, the development process of the RAW data includes an interpolation process of compensating for information on other color components, which are not included in one pixel, by referring to output data having other peripheral color components as shown in FIG. 3 because output data from one CCD has only information on one of the color components of RGB in the RAW data, a color reproducing process of matching the spectroscopic characteristics of the color filter covered on the CCD with the sensitive characteristics of the eyes of human, and a gamma correction process of correcting the output from the CCD having non-linear device characteristics. In the case where the RAW data is converted into the print data, the above-described development process needs to be performed. Since the development process requires a relatively long processing time, the process is delayed compared with the case where the JPEG data is converted into the print data. In the present embodiment, when the plurality of pieces of image data including the JPEG data and the RAW data are selected and the printing is instructed, first, the JPEG data which can be converted into the print data within a relatively short time period is converted into the print data, the conversion of the RAW data into the print data is suspended, and the development process of the RAW data is performed using the standby time when the print data in the print standby state is accumulated until the total print requiring time T becomes equal to or greater than the threshold Tref. Accordingly, since an idle time in which the printing is not executed by the printer engine 24 can be suppressed, the printing can be efficiently executed by the printer engine 24 and the print requiring time can be shortened.

If it is determined that the unprocessed data is not present excluding the RAW data in the hold state in the step S190, since the unprocessed JPEG data is not present, it is determined that the development process of the RAW data needs to be performed although the idle time in which the printing is not executed by the printer engine 24 occurs. Accordingly, the development process of the RAW data in the hold state is performed and the print data is prepared (steps S200 to S230) and the routine returns to the step S160.

Now, the correspondence between the components of the present embodiment and the components of the invention will be described. The operation panel 50 (buttons 54) or the internal communication interface 69 of the present embodiment correspond to a print instruction receiving unit and the main controller 60 for executing the print process routine of FIG. 4 and the total print requiring time calculation routine of FIG. 5 corresponds to a print data preparing unit. In the present embodiment, an example of the method of controlling the printing device of the invention can be understood by describing the operation of the multi-functional printer 10.

According to the multi-functional printer 10 of the present embodiment, the printer engine 24 is controlled such that the print data is prepared from the JPEG data and the printing is executed on the basis of the print data when the plurality of pieces of image data including the JPEG data and the RAW data are selected and the printing is instructed and the printer engine 24 is controlled such that the preparation of the print data from the RAW data is suspended and the development process of the suspended RAW data is performed so as to prepare the print data when the print data in the print standby state is accumulated until the total print requiring time T becomes equal to or greater than the threshold Tref, and the printing is executed on the basis of the print data, the print data to be printed by the printer engine 24 is not generated while the development process having a relatively long processing time is performed and thus the idle time can be suppressed from occurring. As a result, the printing can be efficiently executed by the printer engine 24 and the print requiring time can be shortened. In addition, since the total print requiring time T is calculated on the basis of the print condition such as the sheet size or the print quality, this calculation can be more accurately performed.

Although the threshold Tref is set as the time necessary for the process of performing the development process with respect to the RAW data and preparing the print data in the present embodiment, the invention is not limited thereto. For example, the threshold Tref may be set as a time necessary for only the development process of the RAW data or the threshold Tref may be set as a time between a time necessary for only the development process of the RAW data and a time necessary for the process of performing the development process with respect to the RAW data and preparing the print data.

Although the print requiring time ΔT set on the basis of the print condition such as the sheet size or the print quality is added so as to set the total print requiring time T whenever the print data is prepared and the development process of the RAW data in the hold state is performed when the set total print requiring time T becomes equal to or greater than the threshold Tref in the present embodiment, the invention is not limited thereto. A constant time may be added regardless of the print condition so as to set the total print requiring time T whenever the print data is prepared and the development process of the RAW data in the hold state may be performed when the set total print requiring time T becomes equal to or greater than the threshold Tref. Alternatively, a constant time may be added to the number of pieces of print data in the print standby state so as to set the total print requiring time T, the threshold Tref may be changed on the print condition, and the development process of the RAW data in the hold state may be performed when the set total print requiring time T becomes equal to or greater than the threshold Tref. Instead of setting and comparing the total print requiring time T with the threshold Tref, the development process of the RAW data in the hold state may be performed when the number of pieces of data (the number of images) of the print data in the print standby state becomes equal to or greater than a predetermined number.

Although the RAW file or the JPEG file is read from the memory card 42 in the present embodiment, this file may be read from any device. For example, this file may be read from the memory 66 which receives the file from the digital camera by infrared communication and temporarily stores the file, may be read from a memory included in the digital camera connected by the USB connection, or may be read from the memory 66 which receives the file from another computer over a computer network (for example, the Internet) and temporarily stores the file. In these cases, an infrared communication board, a USB controller or a network interface board for realizing the infrared communication, the USB connection or the network connection may be included.

Although the invention is applied to the multi-functional printer 10 including the printer unit 20 and the scanner unit 30 in the above-described embodiment, the invention may be applied to a printer which does not include the scanner unit 30.

Although a full-color printer 10 using ink as a coloring agent by employing an ink jet method is used in the above-described embodiment, a color laser printer using a toner as a coloring agent by employing an electrophotographic method or a color printer using an ink ribbon as a coloring agent by employing a thermal transfer method may be used. A printing device such as a FAX machine or a copier may be used.

Although the embodiment of the invention is described, the invention is not limited to the above-described embodiment and may be variously modified without departing from the technical scope of the invention.

The entire disclosure of Japanese Patent Application No. 2007-210039, filed Aug. 10, 2007 is incorporated by reference herein.

What is claimed is:

1. A printing device for preparing print data from image data and sequentially printing the print data, the printing device comprising:
   a print instruction receiving unit which receives a print instruction with the selection of the image data; and
   a print data preparing unit which, when the print instruction is received by the print instruction receiving unit with the selection of a plurality of pieces of image data including JPEG data and RAW data before a development process, performs a process of preparing the print data from the JPEG data among the plurality of pieces of selected image data prior to a process for performing the development process with respect to the RAW data and preparing the print data if at least a predetermined amount of print data in a print standby state, in which printing is not completed by the printing device, is not present, and performs the process for performing the development process with respect to the RAW data and preparing the print data prior to the process of preparing the print data from the JPEG data if the at least predetermined amount of print data in the print standby state, in which printing is not completed by the printing device, is present.

2. The printing device according to claim 1, wherein the predetermined amount is decided such that a time necessary for printing the print data in the print standby state becomes equal to or greater than a time necessary for at least the development process.

3. The printing device according to claim 1, wherein: the print instruction receiving unit receives the print instruction with print setting, and the print data preparing unit determines whether the at least predetermined amount of print data in the print standby state is present on the basis of the print setting.

4. The printing device according to claim 3, wherein the print setting includes a sheet size and/or print quality.

5. The printing device according to claim 1, wherein the print data preparing unit performs the development process with respect to the RAW data and prepares the print data although the at least predetermined amount of print data in the print standby state is not present when unprocessed JPEG data from which the print data should be prepared is not present.

6. A method of controlling a printing device for preparing print data from image data and sequentially printing the print data, the method comprising:
   receiving a print instruction with the selection of the image data; and
   when the print instruction is received with the selection of a plurality of pieces of image data including JPEG data and RAW data before a development process, performing a process of preparing the print data from the JPEG data among the plurality of pieces of selected image data prior to a process for performing the development process with respect to the RAW data and preparing the print data if at least a predetermined amount of print data in a print standby state, in which printing is not completed by the printing device, is not present, and performing the process for performing the development process with respect to the RAW data and preparing the print data prior to the process of preparing the print data from the JPEG data if the at least predetermined amount of print data in the print standby state, in which printing is not completed by the printing device, is present.

7. A non-transitory computer-readable medium recorded with a program for executing the steps of the method of controlling the printing device according to claim 6 on one or a plurality of computers.

* * * * *